United States Patent
Kawasaki

(10) Patent No.: US 8,654,891 B2
(45) Date of Patent: Feb. 18, 2014

(54) PEAK SUPPRESSING APPARATUS, PEAK SUPPRESSING METHOD AND WIRELESS COMMUNICATIONS APPARATUS

(75) Inventor: Toshio Kawasaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 6 days.

(21) Appl. No.: 13/475,040

(22) Filed: May 18, 2012

(65) Prior Publication Data

US 2012/0328048 A1 Dec. 27, 2012

(30) Foreign Application Priority Data

Jun. 21, 2011 (JP) ................................. 2011-137377

(51) Int. Cl.
*H04K 1/02* (2006.01)
(52) U.S. Cl.
USPC ........ 375/296; 375/295; 375/297; 455/114.3; 455/43; 455/105; 455/63.1; 455/91
(58) Field of Classification Search
USPC .............. 375/295–315; 455/43, 63.1, 91–129
See application file for complete search history.

(56) References Cited

U.S. PATENT DOCUMENTS

| 4,613,961 A | 9/1986 | Aarts |
| 6,687,452 B1 | 2/2004 | Higuchi |
| 7,170,952 B2 * | 1/2007 | Hunton .......................... 375/296 |
| 2003/0022639 A1 | 1/2003 | Hongo et al. |
| 2007/0195909 A1 | 8/2007 | Ishikawa et al. |
| 2012/0076250 A1 * | 3/2012 | Kravtsov ....................... 375/350 |

FOREIGN PATENT DOCUMENTS

| JP | 59-144050 | 8/1984 |
| JP | 6-197373 | 7/1994 |
| JP | 2000-197007 | 7/2000 |
| JP | 2003-46480 | 2/2003 |
| JP | 2007-251909 | 9/2007 |
| JP | 2010-68033 | 3/2010 |

* cited by examiner

*Primary Examiner* — Daniel Washburn
*Assistant Examiner* — Rahel Guarino
(74) *Attorney, Agent, or Firm* — Katten Muchin Rosenman LLP

(57) ABSTRACT

A peak suppressing apparatus includes a pre-emphasis section that performs a pre-emphasis process on a signal, which is to be wirelessly transmitted and a peak of which is to be suppressed, the pre-emphasis process emphasizing a given frequency range component of the signal, a clipping section that limits, to a given threshold value, an amplitude of the signal that has been subjected to the pre-emphasis process, a de-emphasis section that performs a de-emphasis process on the signal, whose amplitude has been limited, the de-emphasis process suppressing the given frequency range component of the signal, and a frequency converter that converts, to allow wireless transmission, a frequency of the signal that has been subjected to the de-emphasis process.

12 Claims, 13 Drawing Sheets

PEAK SUPPRESSING APPARATUS, PEAK SUPPRESSING METHOD AND WIRELESS COMMUNICATIONS APPARATUS

CROSS-REFERENCE TO RELATED APPLICATION

This application is based upon and claims the benefit of priority of the prior Japanese Patent Application No. 2011-137377, filed on Jun. 21, 2011, the entire contents of which are incorporated herein by reference.

FIELD

The embodiments discussed herein are related to a peak suppressing apparatus, a peak suppressing method and a wireless communications apparatus.

BACKGROUND

In a wireless communications apparatus, a generated signal may be, for example, amplified by an amplifier before transmission. Since the amplifier consumes a large amount of power, it is desirable to improve power utilization efficiency when the amplifier is used. However, although power utilization efficiency may be improved when the amplifier has large output power, one characteristics of an amplifier is that the output saturates above a certain value. When the amplifier is saturated, an output signal therefrom is distorted nonlinearly, a spectrum of the transmission signal broadens to an out-of-band frequency range, and the transmission signal becomes an interference wave to waves at other frequencies. It is preferable to use an amplifier at a high efficiency within a limited input power range where no distortion is generated.

Accordingly, a method used in the related art is where a signal is transmitted after minimizing the ratio of a peak component to an average power (that is, peak-to-average power ratio, PAPR) in a transmission signal. In other words, when the amplifier is operated so that the amplifier is allowed to amplify a signal that has a high average power while keeping to the amplifier's limited input power range, the amplifier may be used at a high operation efficiency while reducing the generation of nonlinear distortion in the transmission signal.

As a peak suppressing method for a transmission signal, a method that combines both amplitude limiting through non-linear processing (that is, hard clipping, HC) and filtering (that is, low pass filtering, LPF) is proposed. In the peak suppressing method, the amplitude of a signal input to the amplifier is limited by HC, and then the LPF removes a broadened spectrum component, which corresponds to the out-of-band frequency region, of the signal that was generated by the amplitude limiting (for example, see Japanese Laid-open Patent Publication No. 2007-251909).

Furthermore, in the related art, a peak limiter and a multi-carrier amplifier apparatus are proposed (for example, see Japanese Laid-open Patent Publication No. 2003-046480). The peak limiter and the multi-carrier amplifier apparatus perform efficient peak limiting so as that a peak factor desirable for an input signal to an amplifier may be accurately obtained, improving the power efficiency of an amplifying system.

SUMMARY

According to an aspect of the invention, a peak suppressing apparatus includes a pre-emphasis section that performs a pre-emphasis process on a signal, which is to be wirelessly transmitted and a peak of which is to be suppressed, the pre-emphasis process emphasizing a given frequency range component of the signal, a clipping section that limits, to a given threshold value, the amplitude of a signal that has been subjected to the pre-emphasis process, a de-emphasis section that performs a de-emphasis process on a signal, whose amplitude has been limited, the de-emphasis process suppressing a given frequency range component of the signal, and a frequency converter that converts, to allow wireless transmission, the frequency of a signal that has been subjected to the de-emphasis process.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Hereinafter, embodiments will be described in detail with reference to the drawings.

First Embodiment

While inventing the present embodiments, observations were made regarding a related art. Such observations include the following, for example.

In the peak suppressing method that combines the HC and the LPF, for example, the following two schemes may be adopted to suppress signal peaks to desired amplitude.

(1) After passing through the LPF, perform strict HC in consideration of peak restoration in order to suppress signal peaks to the desired amplitude.

(2) Repeat the above HC and LPF processes in order to suppress the signal peaks to the desired amplitude.

However, in scheme (1), one concern is that the degradation, with respect to the peak suppression amount, of either modulation accuracy or the bit error rate characteristics may become larger. In scheme (2), one concern is that both circuit size and power consumption may increase.

Figure 1:
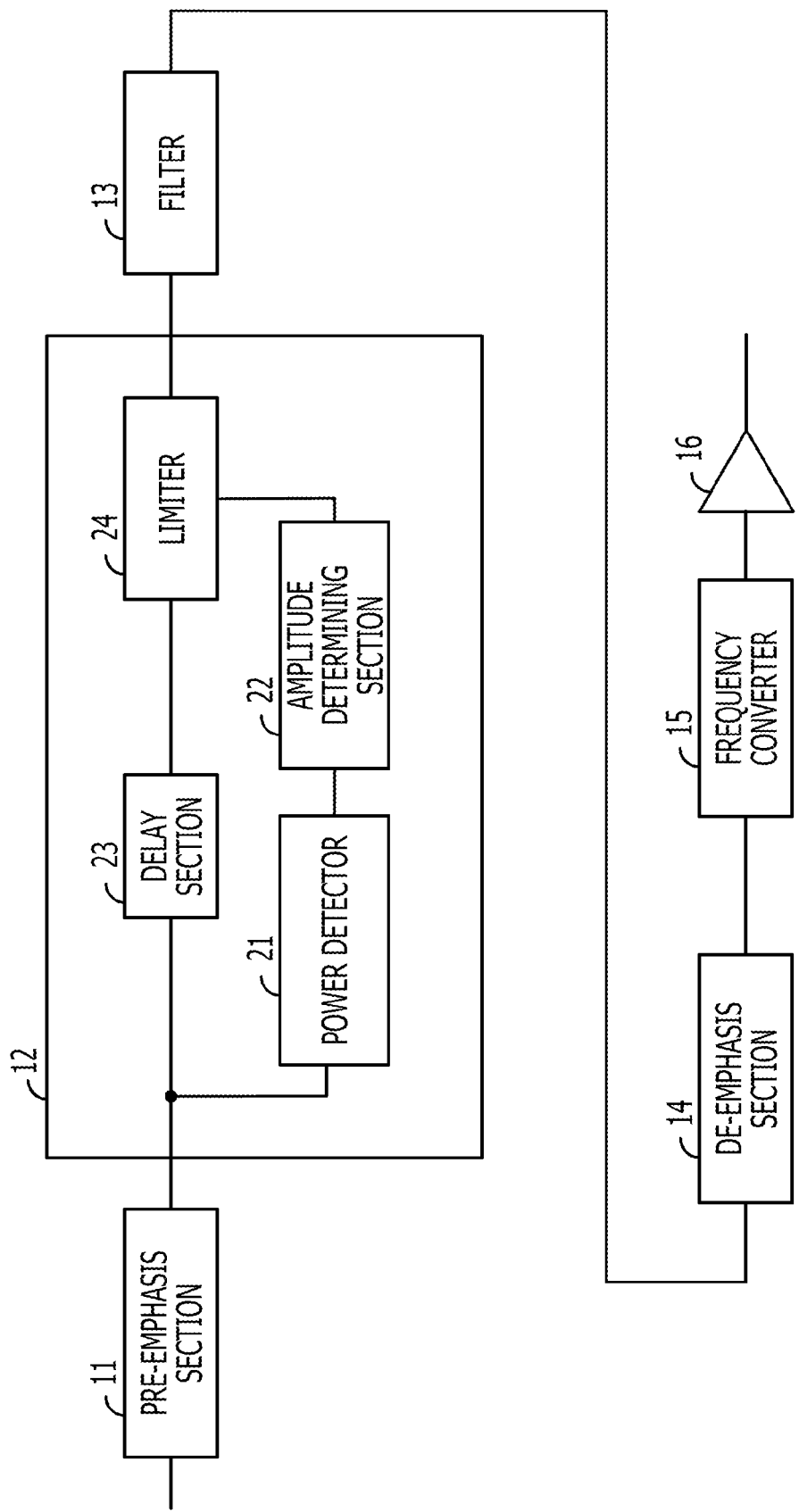
FIG. 1 is a diagram illustrating hardware blocks of a peak suppressing apparatus according to a first embodiment.

FIG. 1 is a diagram illustrating hardware blocks of a peak suppressing apparatus according to the first embodiment. As illustrated in FIG. 1, the peak suppressing apparatus includes a pre-emphasis section 11, a clipping section 12, a filter 13, a de-emphasis section 14, a frequency converter 15 and an amplifier device 16. The peak suppressing apparatus illustrated in FIG. 1 may be installed, for example, in a wireless communications apparatus such as a base station.

The pre-emphasis section 11 is input with a signal to be wirelessly transmitted. For example, a baseband signal (I, Q), which is to be wirelessly transmitted to a wireless terminal such as a portable phone, may be input to the pre-emphasis section 11. The pre-emphasis section 11 performs pre-emphasis processing on the input signal, and outputs to the clipping section 12. That is, the pre-emphasis section 11 emphasizes a high-frequency component of the input signal, and outputs to the clipping section 12.

The clipping section 12 limits (or clips) the amplitude of a signal output from the pre-emphasis section 11 at a given threshold value. The clipping section 12 includes a power detector 21, an amplitude determining section 22, a delay section 23 and a limiter 24.

The power detector 21 detects the amplitude (that is, the envelope curve) of an input signal. For example, the baseband signal (I, Q), whose high-frequency component is emphasized by the pre-emphasis section 11, may be input to the power detector 21. The power detector 21 calculates and outputs the amplitude $r=(I^2+Q^2)^{1/2}$ of the input baseband signal. Below, a signal output from the power detector 21 may also be called an envelope signal.

The amplitude determining section 22 determines whether or not the amplitude of the envelope signal output from the power detector 21 is larger than the given threshold value. The amplitude determining section 22 outputs a result of the determination to the limiter 24.

The delay section 23 delays a signal output from the pre-emphasis section 11. For example, the delay section 23 may delay the signal output from the pre-emphasis section 11 so that timing of a signal that is to be input to the limiter 24 coincides with timing of the signal whose amplitude is to be determined by the amplitude determining section 22.

The limiter 24 limits (or clips) the amplitude of an input signal based on the result of the determination output from the amplitude determining section 22. For example, the limiter 24 may clip the baseband signal (I, Q) output from the delay section 23 so that the envelope amplitude of the baseband signal (I, Q) is clipped at the given threshold value, when the amplitude determining section 22 determines that the amplitude of the envelop signal is larger than the given threshold value. That is, the limiter 24 clips the amplitude of an input signal and outputs a clipped signal when the amplitude of the input signal is larger than the given threshold value.

The filter 13 removes an out-of-band component generated by the limiting process of the limiter 24. For example, when a signal to be wirelessly transmitted is clipped by the limiter 24, the signal's spectrum may broaden to include an out-of-band frequency region, and the signal may become an interference wave to waves at other frequencies. To suppress the interference wave affecting other frequency waves, the filter 13 limits the frequency band of a signal output from the limiter 24. The filter 13 may be a LPF, for example, and may remove a spectrum component broadened to the out-of-band frequency range.

The de-emphasis section 14 suppresses (or reduces) a high-frequency component of a signal output from the filter 13, and outputs to the frequency converter 15. That is, the de-emphasis section 14 brings frequency characteristics of a signal, whose high frequency component is emphasized by the pre-emphasis section 11, back to the signal's original state. The de-emphasis section 14 may have, for example, frequency characteristics that are an inverse of the pre-emphasis section 11's frequency characteristics.

The frequency converter 15 converts the frequency of a signal output from the de-emphasis section 14 to a radio frequency. For example, the frequency converter 15 may be an orthogonal modulator, and multiply the input baseband signal (I, Q) by orthogonal carrier waves and sum the resulting signals before outputting the sum.

The amplifier 16 amplifies a signal output from the frequency converter 15. A signal amplified by the amplifier 16 may be, for example, wirelessly transmitted to a wireless terminal through an antenna.

Figure 2:
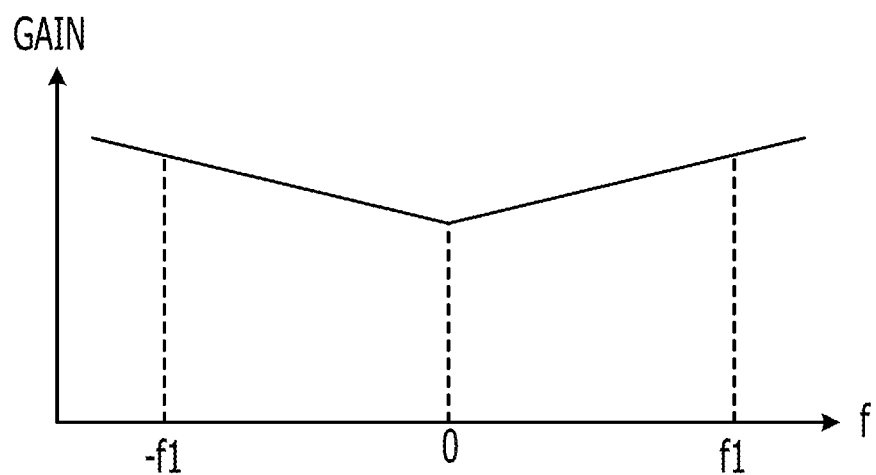
FIG. 2 is a diagram illustrating frequency characteristics of a pre-emphasis section.

FIG. 2 is a diagram illustrating frequency characteristics of the pre-emphasis section 11. The horizontal axis of a graph illustrated in FIG. 2 represents the frequency, and the vertical axis represents the gain. A frequency range between −f1 and f1 as illustrated in FIG. 2 represents the frequency band of a signal to be wirelessly transmitted.

The pre-emphasis section 11 has frequency characteristics similar to the frequency characteristics illustrated in FIG. 2. That is, the frequency characteristics are such that the gain becomes larger as the frequency becomes higher. According to the above arrangement, the high-frequency component of the signal to be wirelessly transmitted is emphasized by the pre-emphasis section 11, and output to the clipping section 12.

Figure 3:
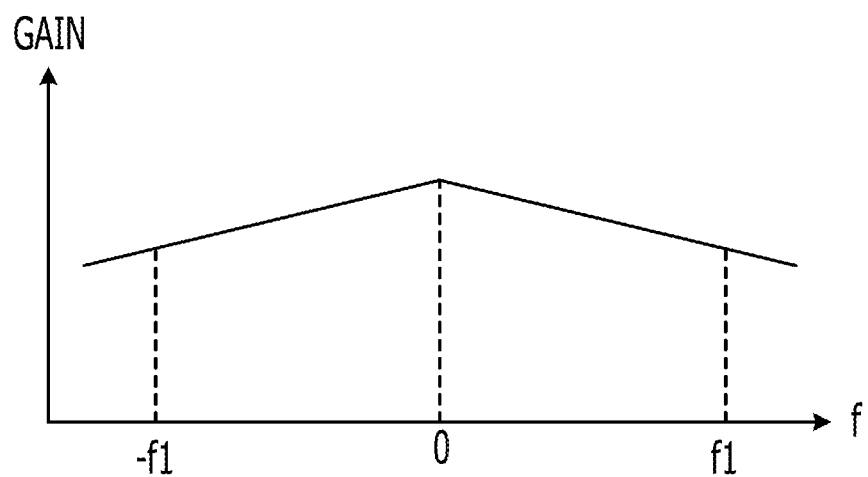
FIG. 3 is a diagram illustrating frequency characteristics of a de-emphasis section.

FIG. 3 is a diagram illustrating frequency characteristics of the de-emphasis section 14. The horizontal axis of a graph illustrated in FIG. 3 represents the frequency, and the vertical axis represents the gain. A frequency range between −f1 and f1 illustrated in FIG. 3 represents the frequency band of a signal to be wirelessly transmitted.

The de-emphasis section 14 has frequency characteristics similar to the frequency characteristics illustrated in FIG. 3. The de-emphasis section 14 has frequency characteristics that are inverse to the frequency characteristics of the pre-emphasis section 11, which are illustrated in FIG. 2. That is, the de-emphasis section 14's frequency characteristics are such that the gain becomes smaller as the frequency becomes higher. According to the above arrangement, the high frequency component of the signal to be wirelessly transmitted is suppressed by the de-emphasis section 14, and the signal is output to the frequency converter 15.

Figure 4A:
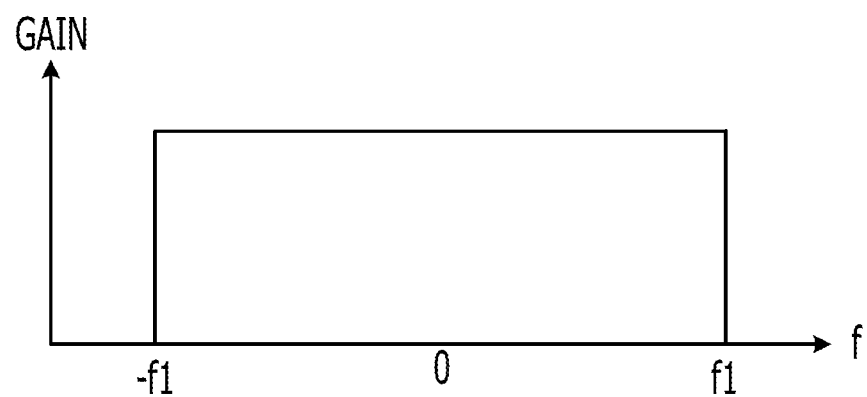
FIG. 4A and FIG. 4B are diagrams illustrating examples of signal spectrums.
Figure 4B:
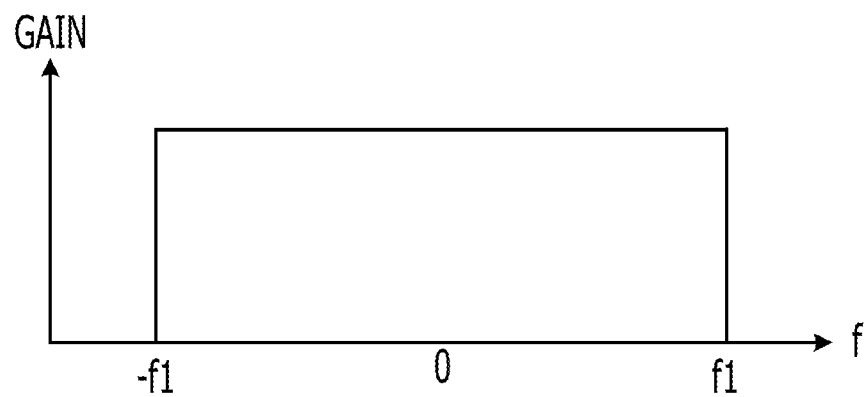

FIG. 4A and FIG. 4B are diagrams illustrating examples of signal spectrums. FIG. 4A illustrates a spectrum example of a signal input to the pre-emphasis section 11, and FIG. 4B illustrates a spectrum example of a signal output from the de-emphasis section 14.

The pre-emphasis section 11 may receive an input signal having, for example, flat frequency characteristics as illustrated in FIG. 4A. The high-frequency component for the signal, which has frequency characteristics as illustrated in FIG. 4A, will be emphasized by the pre-emphasis section 11, and the high-frequency component will be suppressed by the de-emphasis section 14. Accordingly, as illustrated in FIG. 4B, the de-emphasis section 14 outputs a signal having approximately the same frequency characteristics as in FIG.

4A. In other words, the signal to be wirelessly transmitted is output to the frequency converter 15 while keeping approximately the same frequency characteristics as that of the signal input to the pre-emphasis section 11.

The amplitude of a signal output from the pre-emphasis section 11 is clipped by the clipping section 12. As a result, a signal output from the clipping section 12 has a spectrum component that has been broadened to the out-of-band frequency range. For example, the frequency range of the signal output from the clipper 12 may be broadened beyond the frequency range between −f1 and f1 illustrated in FIG. 4A.

However, the filter 13 removes the out-of-band component generated via the limiting process of the limiter 24. For example, the filter 13 may cutoff a frequency component higher than f1. Accordingly, the frequency converter 15 receives an input signal having frequency components as illustrated in FIG. 4B.

Figure 5:
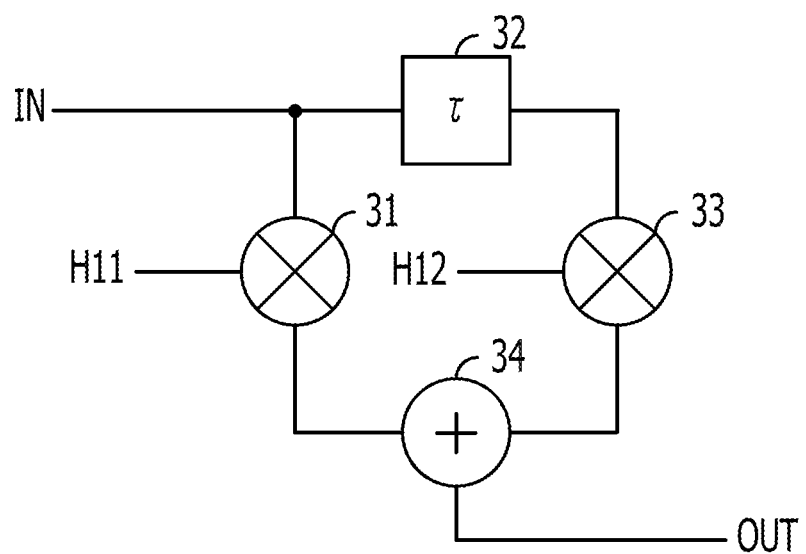
FIG. 5 is a diagram illustrating an example of hardware blocks of the pre-emphasis section.

FIG. 5 is a diagram illustrating an example of hardware blocks of the pre-emphasis section 11. FIG. 5 illustrates an example of the pre-emphasis section 11, which may be formed from a finite impulse response (FIR) filter. As illustrated in FIG. 5, the FIR filter includes multipliers 31, 33, a delay device 32 and an adder 34.

The multiplier 31 is input with a signal (designated as "in" in FIG. 5) that is to be pre-emphasized. That is, the signal to be wirelessly transmitted is input to the multiplier 31. Furthermore, a coefficient h11 is input to the multiplier 31. The multiplier 31 multiplies the signal to be wirelessly transmitted by the coefficient h11, and outputs to the adder 34.

The delay device 32 is input with the signal to be wirelessly transmitted. The delay device 32 delays the input signal for a given time period, and outputs the signal to the multiplier 33.

The multiplier 33 is input with the signal output from the delay device 32. Furthermore, a coefficient h12 is input to the multiplier 33. The multiplier 33 multiplies a signal, which is output from the delay device 32 and is to be wirelessly transmitted, by the coefficient h12, and outputs to the adder 34.

The adder 34 adds a signal output from the multiplier 31 and a signal output from the multiplier 33. An added signal ("out" in FIG. 5) is output to the clipping section 12 described in FIG. 1.

The frequency characteristics of a FIR filter may be adjusted to form the characteristics illustrated in FIG. 2 by suitably selecting the number of coefficients (the number of taps) and values of the coefficients of the FIR filter. According to the above arrangement, the high-frequency component of a signal input to the FIR filter is emphasized, and the emphasized signal is output.

Figure 6:
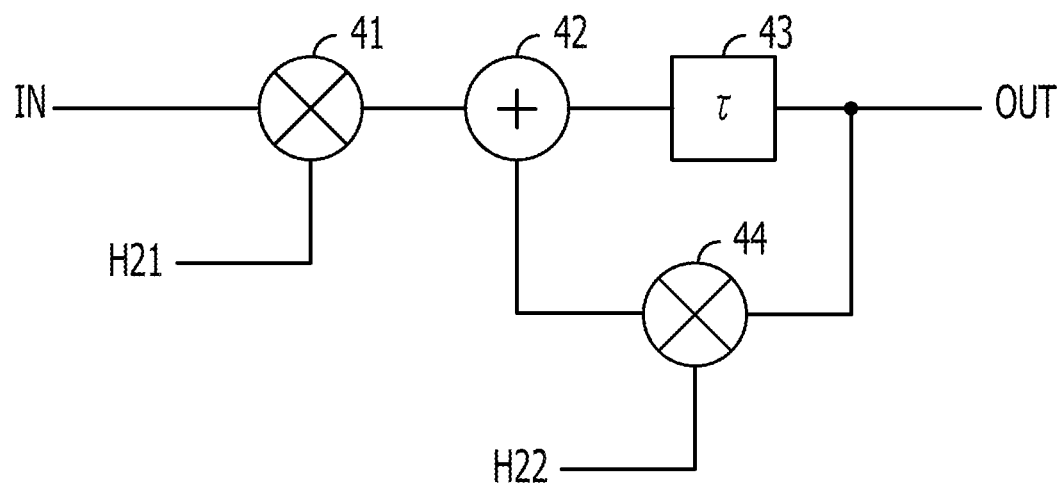
FIG. 6 is a diagram illustrating an example of hardware blocks of the de-emphasis section.

FIG. 6 is a diagram illustrating an example of hardware blocks of the de-emphasis section 14. FIG. 6 illustrates an example of the de-emphasis section 14, which is formed from an infinite impulse response (IIR) filter. As illustrated in FIG. 6, the IIR filter includes multipliers 41, 44, an adder 42 and a delay device 43.

The multiplier 41 is input with a signal ("in" in FIG. 6) to be de-emphasized. That is, the multiplier 41 is input with a signal output from the filter 13 illustrated in FIG. 1. Furthermore, a coefficient h21 is input to the multiplier 41. The multiplier 41 multiplies the signal output from the filter 13 by the coefficient h21, and outputs to the adder 42.

The adder 42 receives a signal output from the multiplier 41 and a signal output from the multiplier 44. The adder 42 adds the signal output from the multiplier 41 and the signal output from the multiplier 44, and outputs to the delay device 43.

The delay device 43 is input with a signal output from the adder 42. The delay device 43 delays the input signal for a given time period, and outputs to the multiplier 44. Furthermore, a signal ("out" in FIG. 6) delayed by the delay device 43 is output to the frequency converter 15 described in FIG. 1.

The multiplier 44 is input with a signal output from the delay device 43 and a coefficient h22. The multiplier 44 multiplies the signal output from the delay device 43 by the coefficient h22, and outputs to the adder 42.

The frequency characteristics of an IIR filter may be adjusted to form the frequency characteristics illustrated in FIG. 3 by suitably selecting the number of coefficients and values of the coefficients of the IIR filter. According to the above arrangement, the high-frequency component of the signal input to the IIR filter is suppressed, and the suppressed signal is output.

Alternatively, the pre-emphasis section 11 described in FIG. 5 may be formed from an IIR filter. Furthermore, the de-emphasis section 14 described in FIG. 6 may alternatively be formed from a FIR filter.

Below, a peak suppressing apparatus without the pre-emphasis section 11 and the de-emphasis section 14 will be described.

Figure 7:
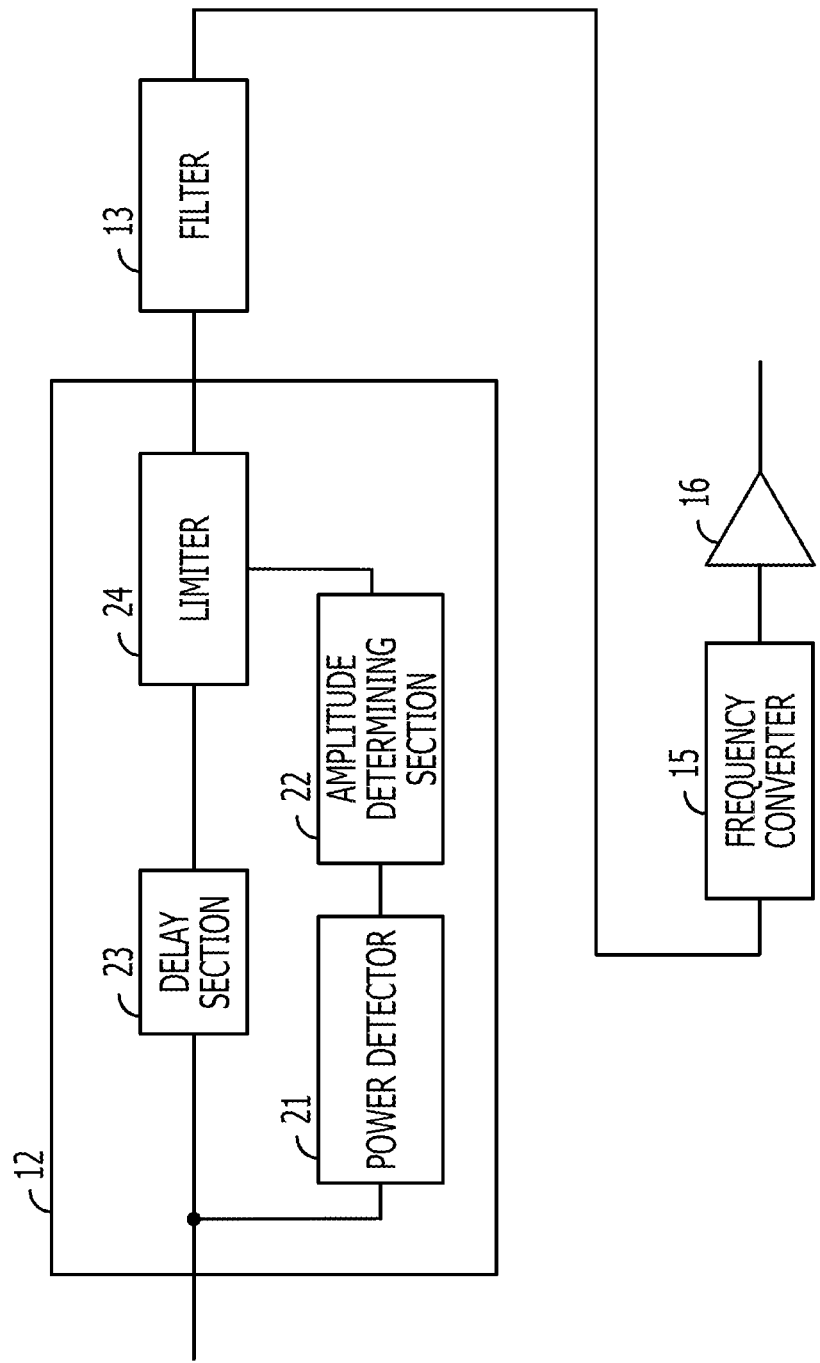
FIG. 7 is a diagram illustrating hardware blocks of a peak suppressing apparatus that doesn't have the pre-emphasis section and the de-emphasis section.

FIG. 7 is a diagram illustrating hardware blocks of the peak suppressing apparatus without a pre-emphasis section and a de-emphasis section. In FIG. 7, reference numerals that are the same as reference numerals in FIG. 1 denote elements that are the same as those of FIG. 1, and descriptions thereof are omitted. Note that the peak suppressing apparatus of FIG. 7 includes neither the pre-emphasis section 11 nor the de-emphasis section 14 compared to the peak suppressing apparatus of FIG. 1.

Figure 8:
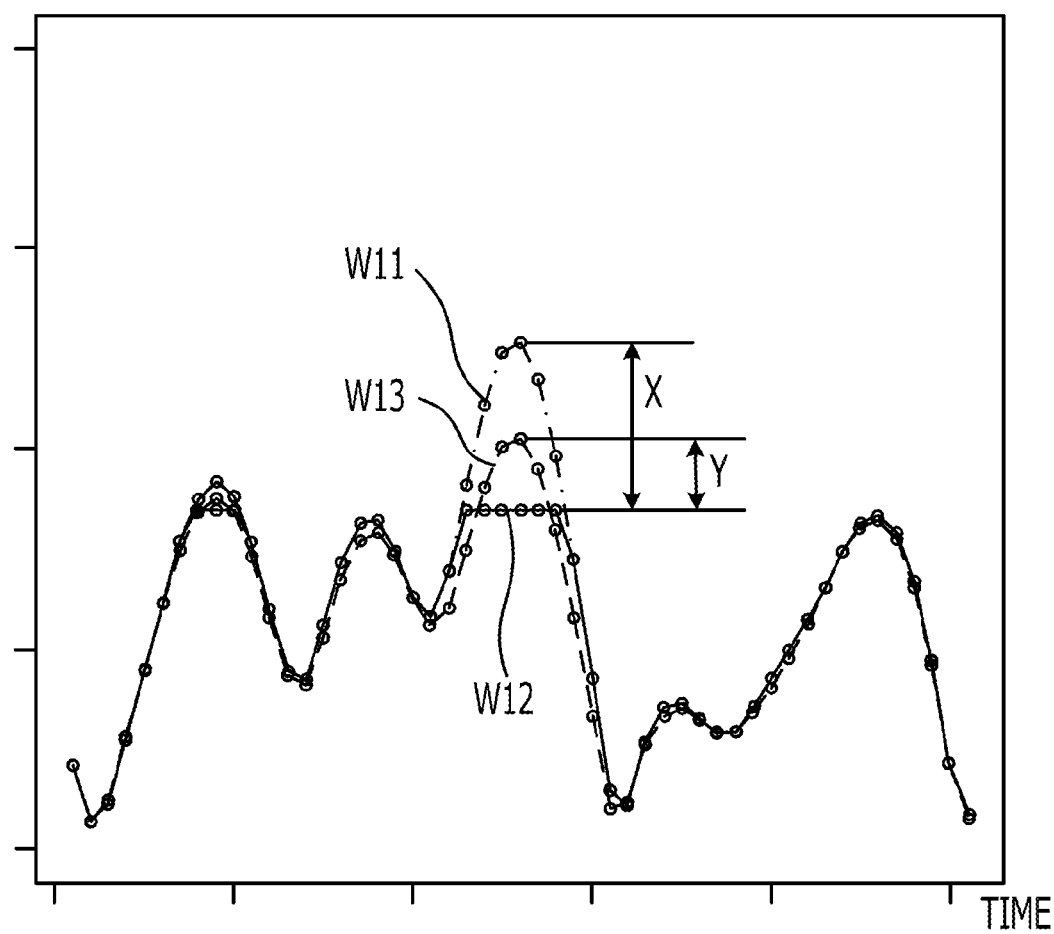
FIG. 8 is a first diagram describing peak suppression.

FIG. 8 is the first diagram describing the peak suppression. The horizontal axis of FIG. 8 represents time, and the vertical axis represents amplitude.

A dot-dashed line waveform W11 indicated in FIG. 8 represents a signal (that is, the envelope curve of the baseband signal (I, Q)) to be input to the clipping section 12 illustrated in FIG. 7.

A solid line waveform W12 represents the signal output from the clipping section 12 illustrated in FIG. 7. The signal input to the clipping section 12 is clipped and output as indicated by the waveform W12 when the amplitude of the signal exceeds a given threshold value.

A dashed line waveform W13 represents the signal output from the filter 13 illustrated in FIG. 7. Although the spectrum of the signal clipped by the clipping section 12 has been broadened to the out-of-band frequency region, the filter 13 removes the broadened spectrum component. Accordingly, a peak of the signal output from the filter 13 is restored as indicated in the waveform W13.

In the peak suppressing apparatus of FIG. 7, a severe clipping process is performed, in light of the peak restoration, after the signal passes the filter 13 in order to suppress signal peaks to a desired amplitude. Alternatively, the clipping process of the clipping section 12 and the filtering process of the filter 13 may be repeated to suppress signal peaks to the desired amplitude.

Figure 9:
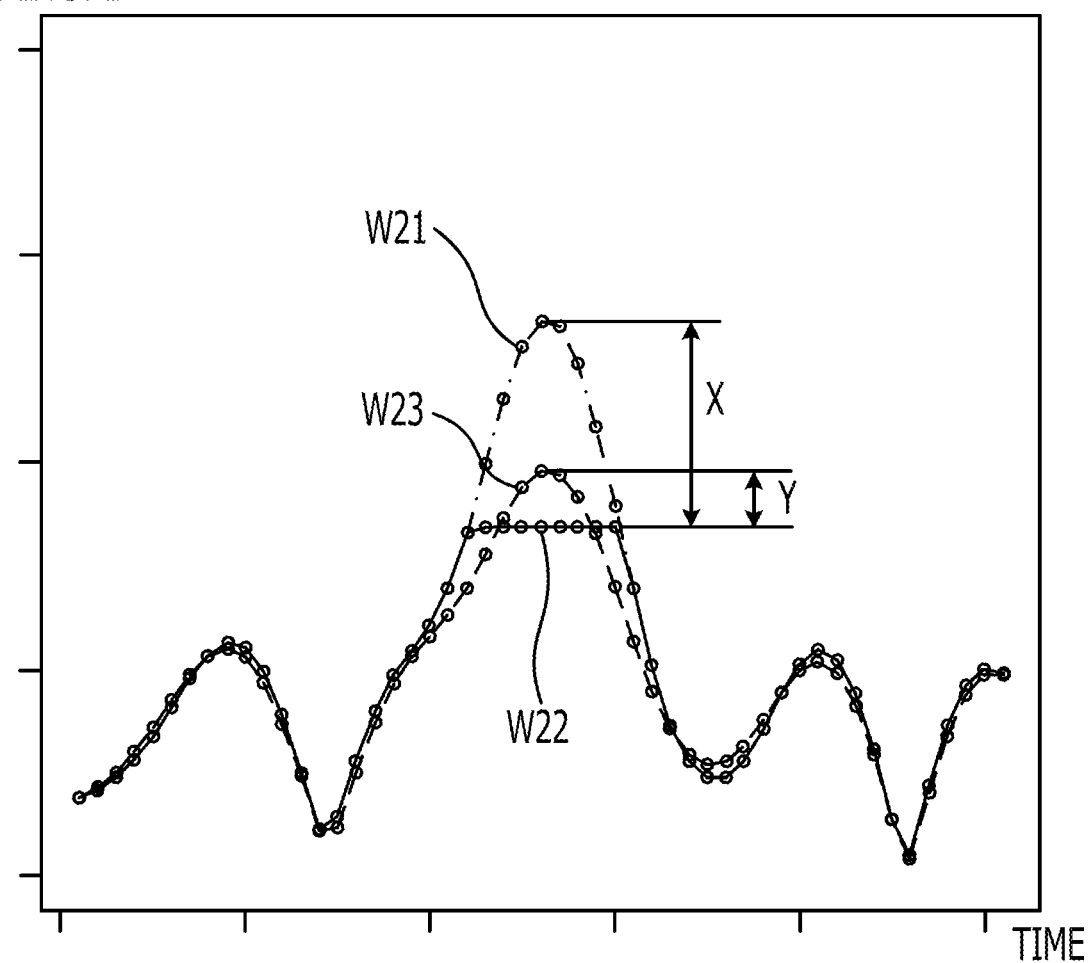
FIG. 9 is a second diagram describing peak suppression.

FIG. 9 is the second diagram describing the peak suppression. The horizontal axis of FIG. 9 represents time, and the vertical axis represents amplitude.

A dot-dashed line waveform W21 indicated in FIG. 9 represents a signal input to the clipping section 12 illustrated in FIG. 7. The signal of the waveform 21 has a frequency lower than that of the signal of the waveform W11 illustrated in FIG. 8. That is, FIG. 9 illustrates where the signal input to the clipping section 12 has a frequency lower than that of the case illustrated in FIG. 8.

A solid line waveform W22 represents a signal output from the clipping section 12 illustrated in FIG. 7. The signal input to the clipping section 12 is clipped and output as indicated in the waveform W22 when the amplitude of the signal exceeds a given threshold value.

A dashed line waveform W23 represents the signal output from the filter 13 illustrated in FIG. 7. Although the spectrum of the signal clipped by the clipping section 12 has been broadened to the out-of-band frequency region, the filter 13 removes the broadened spectrum component. Accordingly, a peak of the signal output from the filter 13 is restored as indicated in the waveform W23.

As described in FIG. 8 and FIG. 9, the peak of the signal suppressed by the clipping section 12 is restored after passing the filter 13. However, when the signal frequency is lower, the peak restoration ratio is smaller than when the signal frequency is higher. For example, in FIG. 9, the ratio of Y to X is small compared to that in FIG. 8. That is, the peak restoration amount in the signal passing through the filter 13 becomes larger as the signal frequency becomes higher.

The peak suppressing apparatus of FIG. 1 uses the characteristic that a peak restoration amount in a signal becomes larger as the signal frequency becomes higher. In the peak suppressing apparatus of FIG. 1, the pre-emphasis section 11 emphasizes the high frequency component of a signal to be wirelessly transmitted. Accordingly, the signal's high-frequency component is subjected to a more severe clipping process in the clipping section 12 than the signal's low-frequency component. As a result, the peak restoration ratio of the signal that passed the filter 13 becomes smaller, and with an apparatus such as the peak suppressing apparatus of FIG. 7, the clipping process of the clipping section 12 and the filtering process of the filter 13 are not repeated. Furthermore, the high-frequency component of the signal that passed the filter 13 is suppressed by the de-emphasis section 14. According to the above arrangement, the frequency characteristics of the signal pre-emphasized in the pre-emphasis section 11 are suppressed by the pre-emphasis section 11, and the signal is output to the frequency converter 15.

Figure 10:
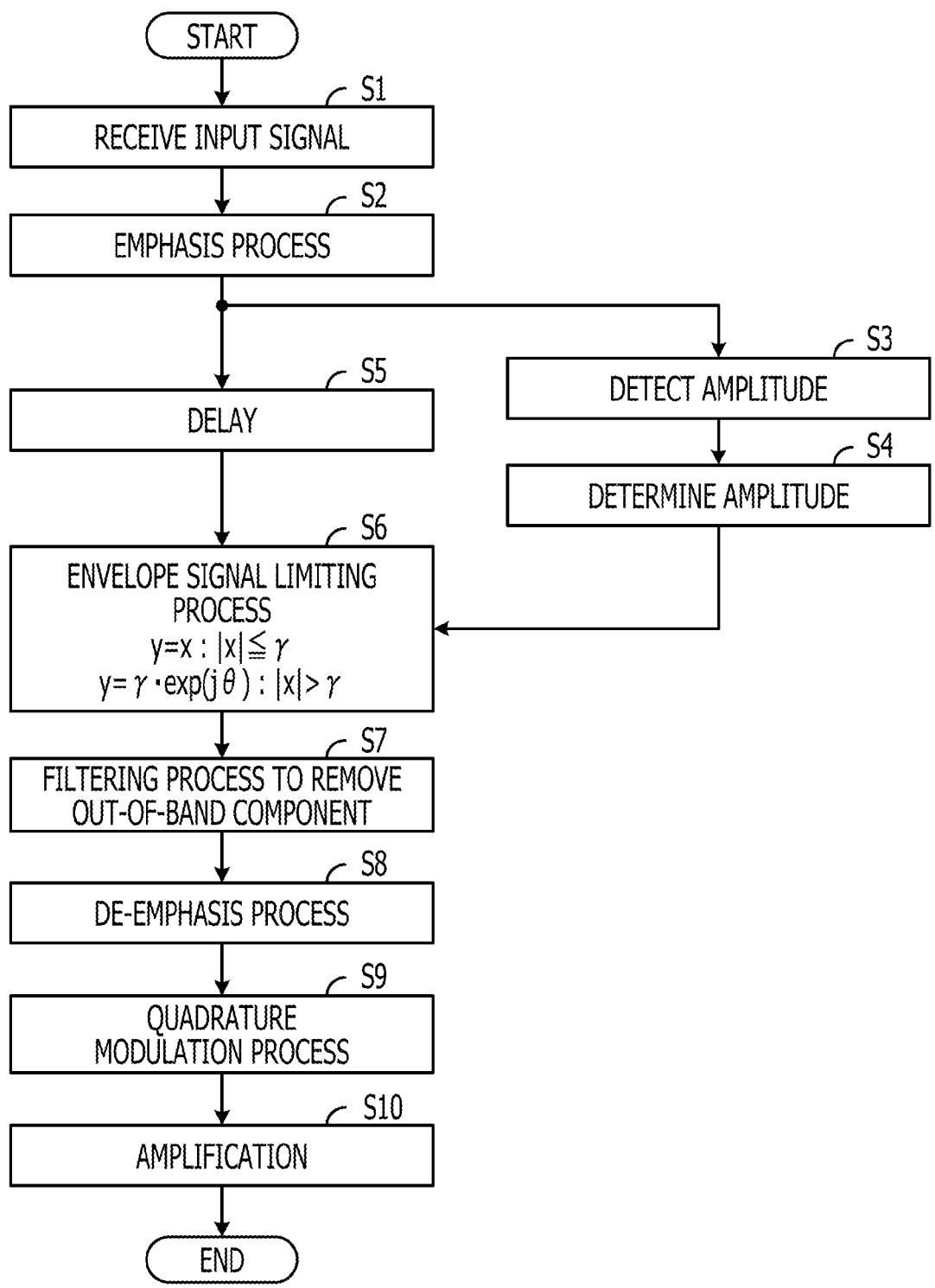
FIG. 10 is a flowchart illustrating processing of the peak suppressing apparatus.

FIG. 10 is a flowchart illustrating processing of the peak suppressing apparatus.

The pre-emphasis section 11 receives the signal to be wirelessly transmitted (step S1).

The pre-emphasis section 11 performs the emphasizing process on the signal received (step S2).

The power detector 21 of the clipping section 12 detects the amplitude of the signal output from the pre-emphasis section 11 (step S3).

The amplitude determining section 22 of the clipping section 12 determines whether or not the amplitude of the signal output from the power detector 21 is larger than a given threshold value (step S4).

The delay section 23 of the clipping section 12 delays the signal output from the pre-emphasis section 11 (step S5). Note that the processes in Steps S3, S4 and the process in Step S5 are performed concurrently.

The limiter 24 of the clipping section 12 performs the amplitude limiting process on the signal output from the delay section 23 (step S6). For example, the limiter 24 may clip the signal output from the delay section 23 at a given threshold value and output a clipped signal when the amplitude determining section 22 determines that the amplitude of the signal output from the power detector 21 is larger than the given threshold value.

For example, assume that the input signal is x (a complex number I+jQ), the amplitude of the input signal is |x|, the phase of the input signal is θ, the threshold value is γ, and a clipping signal output from the clipping section 12 is γ.

The limiter 24 outputs the input signal x without change to the filter 13 when the amplitude determining section 22 determines that the amplitude |x| of the input signal x is equal to or less than the threshold value γ. That is, the limiter 24 outputs y=x to the filter 13 when |x|≤γ.

On the other hand, the limiter 24 outputs a signal, whose amplitude is equal to the threshold value γ, to the filter 13 when the amplitude determining section 22 determines that the amplitude |x| of the input signal x is larger than the threshold value γ. That is, the limiter 24 outputs $y=\gamma \times e^{j\theta}$ to the filter 13 when |x|>γ.

The filter 13 removes the out-of-band component of the signal output from the clipping section 12 (step S7). For example, as described in FIG. 4, when the frequency band of the signal to be wirelessly transmitted has a frequency range between −f1 and f1, the filter 13 may pass the signal in the frequency range between −f1 and f1.

The de-emphasis section 14 performs the de-emphasizing process on the signal output from the filter 13 (step S8).

The frequency converter 15 converts the frequency of the signal output from the de-emphasis section 14 to a radio frequency (step S9). For example, the frequency converter 15 may convert the frequency of the signal (that is, a baseband signal (I, Q)) output from the de-emphasis section 14 to a radio frequency by using a quadrature modulation scheme.

The amplifier 16 amplifies the signal output from the frequency converter 15 (step S10). The signal amplified may be, for example, wirelessly transmitted to a wireless terminal through an antenna.

Accordingly, the peak suppressing apparatus, via the pre-emphasis section 11, pre-emphasizes the high-frequency component of the signal that is to be wirelessly transmitted, and limits the amplitude of the pre-emphasized signal to the given threshold value via the clipping section 12. Furthermore, the peak suppressing apparatus, via the de-emphasis section 14, de-emphasizes the signal output from the clipping section 12, and converts the frequency of the de-emphasized signal to a radio frequency via the frequency converter 15. According to the above arrangement, the peak suppressing apparatus may be able to suppress the degradation of the modulation accuracy and the bit error rate, and may be made in a relatively small size with relatively lower power consumption.

Furthermore, the peak suppressing apparatus, via the pre-emphasis section 11, pre-emphasizes the high-frequency component of the signal to be wirelessly transmitted, and de-emphasizes, via the de-emphasis section 14, the signal output from the clipping section 12. According to the above arrangement, the peak suppressing apparatus may be able to suppress signal peaks to a desired amplitude without repeating, with respect to a signal, band-limiting that uses the LPF and amplitude-limiting, making it possible to reduce processing delay.

Some functions of the peak suppressing apparatus may be implemented, for example, by a digital signal processor (DSP).

Figure 11:
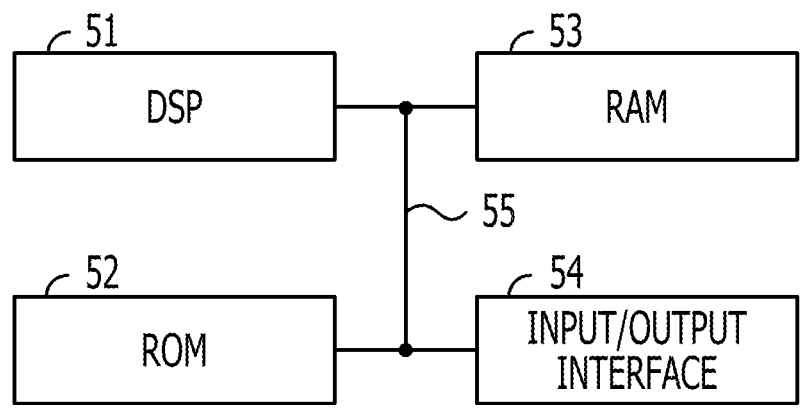
FIG. 11 is a diagram illustrating another example of hardware blocks of the peak suppressing apparatus.

FIG. 11 is a diagram illustrating another example of hardware blocks of the peak suppressing apparatus. As illustrated in FIG. 11, the peak suppressing apparatus includes a DSP 51, a read only memory (ROM) 52, a random access memory (RAM) 53 and an input/output interface 54.

The DSP 51 connects to the ROM 52, the RAM 53 and the input/output interface 54 via a bus 55. The ROM 52 stores an operating system (OS) program and application programs to be run by the DSP 51. The RAM 53 stores various pieces of data that may be used with processing by the DSP 51.

The input/output interface 54 receives an input signal to be processed by the DSP 51. A signal processed by the DSP 51 is output via the input/output interface 54.

The DSP 51 implements functionality of the pre-emphasis section 11, the clipping section 12, the filter 13 and the de-emphasis section 14 described in FIG. 1. For example, application programs to implement the functionality of the pre-emphasis section 11, the clipping section 12, the filter 13 and the de-emphasis section 14, which are described above, may be stored in the ROM 52, and the application programs stored in the ROM 52 may be run by the DSP 51 to implement each section's function.

The signal to be input to the pre-emphasis section 11 of FIG. 1 is input to the input/output interface. Furthermore, the signal that has been subjected to the de-emphasis process or the like by the DSP 51 is output to the frequency converter 15 via the input/output interface 54.

Furthermore, the processes of steps S1-S8 illustrated in FIG. 10 are run by the DSP 51 when the DSP 51 implements the functions of the pre-emphasis section 11, the clipping section 12, the filter 13 and the de-emphasis section 14 illustrated in FIG. 1.

Instead of the DSP 51, a central processing unit (CPU) may be used to implement the functionality of the pre-emphasis section 11, the clipping section 12, the filter 13 and the de-emphasis section 14. Furthermore, a field programmable gate array (FPGA), for example, may alternatively be used to implement the functionality of the pre-emphasis section 11, the clipping section 12, the filter 13 and the de-emphasis section 14 illustrated in FIG. 1.

The DSP 51, the ROM 52, the RAM 53 and the input/output interface 54 may be manufactured as a single chip.

Second Embodiment

The second embodiment will be described in detail with reference to the drawings. The peak suppressing apparatus includes a band-limiting filter for limiting the frequency band of a signal to be wirelessly transmitted. In the second embodiment, the characteristics of a band-limiting filter are added to the pre-emphasis section to reduce the number of parts and the cost. Furthermore, in the second embodiment, the characteristics of a filter that removes an out-of-band component are added to the de-emphasis section to reduce the number of parts and the cost.

Figure 12:
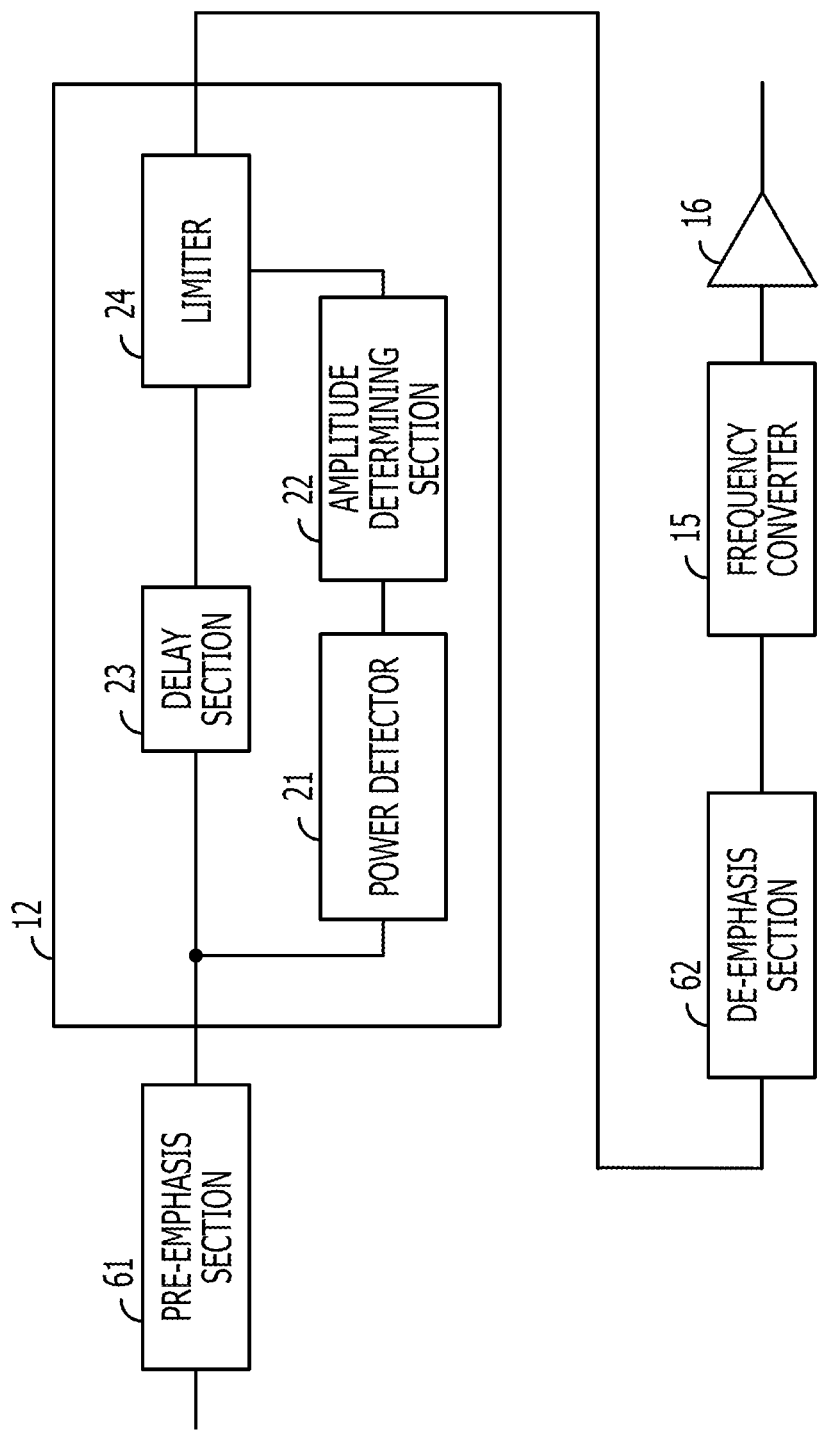
FIG. 12 is a diagram illustrating hardware blocks of a peak suppressing apparatus according to a second embodiment.

FIG. 12 is a diagram illustrating hardware blocks of a peak suppressing apparatus according to the second embodiment. In FIG. 12, reference numerals that are the same as reference numerals in FIG. 1 denote elements that are the same as elements in FIG. 1, and descriptions thereof are omitted. In comparison to the peak suppressing apparatus of FIG. 1, the peak suppressing apparatus of FIG. 12 includes a pre-emphasis section 61 and a de-emphasis section 62. Furthermore, in comparison to the peak suppressing apparatus of FIG. 1, the peak suppressing apparatus of FIG. 12 does not include the filter 13.

The pre-emphasis section 61 is input with a signal to be wirelessly transmitted. For example, a baseband signal (I, Q), which is to be wirelessly transmitted to a wireless terminal such as a portable phone, may be input to the pre-emphasis section 61. The pre-emphasis section 61 performs pre-emphasis and band-limiting processing on the input signal. That is, the pre-emphasis section 61 emphasizes the high-frequency component of the input signal and band-limits the input signal.

For example, the pre-emphasis section 61 may limit the frequency band of the input signal so as that the input signal does not interfere with other signals at different frequencies. For example, the pre-emphasis section 61 may have the characteristics of a LPF that has the cutoff frequency f1 in such a way that the frequency characteristics of the input signal is in the frequency range between −f1 and f1. Furthermore, in addition to the frequency characteristics of a LPF as described above, the pre-emphasis section 61 has frequency characteristics as illustrated in FIG. 2. Accordingly, the pre-emphasis section 61 may be able to emphasize the high-frequency component of the input signal and band-limit the input signal.

The de-emphasis section 62 is input with a signal output from the limiter 24 of the clipping section 12. The de-emphasis section 62 performs de-emphasis processing on the input signal and removes an out-of-band component of the input signal, which is generated by the limiting process performed by the limiter 24. That is, the de-emphasis section 62 suppresses the high-frequency component of the input signal and band-limits the input signal.

For example, the de-emphasis section 62 may have the characteristics of a LPF that has the cutoff frequency f1 so as to remove the out-of-band component generated by the limiting process of the limiter 24. That is, the de-emphasis section 62 has the frequency characteristics of the filter 13 described in FIG. 1. Furthermore, in addition to the LPF frequency characteristics as described above, the de-emphasis section 62 has frequency characteristics as illustrated in FIG. 3. Accordingly, the de-emphasis section 62 may be able to suppress the high-frequency component of the input signal and band-limit the input signal.

The pre-emphasis section 61 and the de-emphasis section 62 may be, for example, formed from a FIR filter illustrated in FIG. 5 and a IIR filter illustrated in FIG. 6, respectively. For example, the pre-emphasis section 61 may be able to emphasize the high-frequency component of the input signal and band-limit the input signal by suitably selecting the number of coefficients and values of the coefficients for the FIR filter. Furthermore, the de-emphasis section 62 may be able to suppress the high-frequency component of the input signal and band-limit the input signal by suitably selecting the number of coefficients and values of the coefficients for the IIR filter.

As illustrated above, the peak suppressing apparatus is configured so that frequency characteristics for band-limiting are added to both the pre-emphasis section 61, which performs the pre-emphasis process, and the de-emphasis section 62, which performs the de-emphasis process. Accordingly, a filter for band-limiting is not provided in the peak suppressing apparatus, thereby making it possible to reduce the number of parts and the cost.

Third Embodiment

The third embodiment will be described in detail with reference to the drawings. In the peak suppressing apparatus, there may be a case where a threshold value for the peak suppression is changed in response to the number of carriers, the modulation scheme, and a desired error vector magnitude (EVM) for a signal to be wirelessly transmitted. In the third embodiment, a pre-emphasis amount and a de-emphasis amount are changed in response to a change to the threshold value for the peak suppression.

Figure 13:
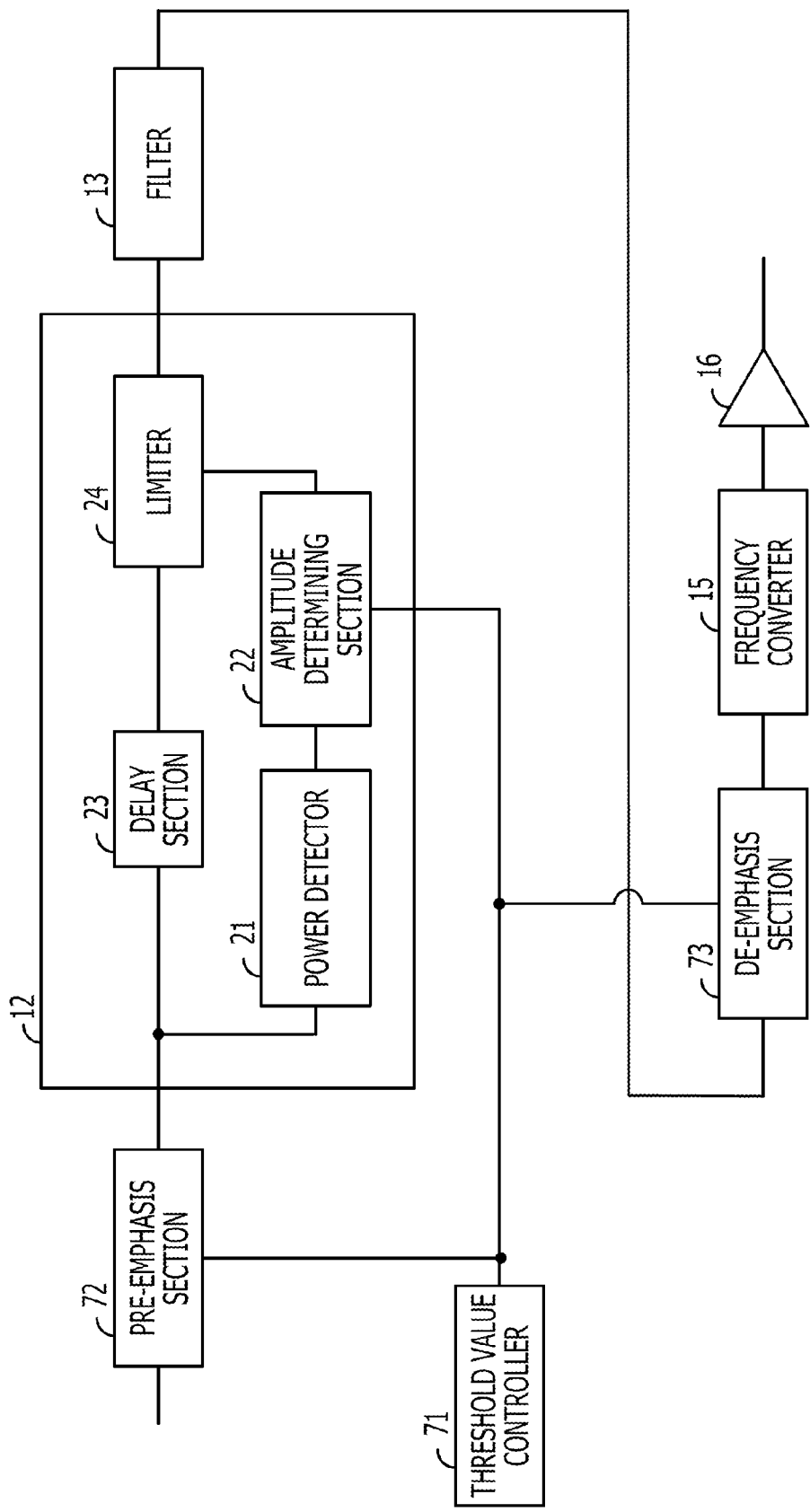
FIG. 13 is a diagram illustrating hardware blocks of a peak suppressing apparatus according to a third embodiment.

FIG. 13 is a diagram illustrating hardware blocks of a peak suppressing apparatus according to the third embodiment. In FIG. 13, reference numerals that are the same as reference numerals in FIG. 1 denote elements that are the same as elements in FIG. 1, and descriptions thereof are omitted. The peak suppressing apparatus of FIG. 13 includes a threshold value controller 71, a pre-emphasis section 72 and a de-emphasis section 73 compared to the peak suppressing apparatus of FIG. 1.

The threshold value controller 71 controls a given threshold value of the amplitude determining section 22. For example, the threshold value controller 71 may control the given threshold value of the amplitude determining section 22 according to the number of carriers, a modulation scheme or a desired EVM for a signal to be wirelessly transmitted.

For example, the threshold value controller 71 may reduce signal distortion so as to satisfy the desired EVM for wireless communications when the desired EVM is small (that is, when the desired EVM is severe). In this case, the threshold value controller 71 increases the threshold value of the amplitude determining section 22 to reduce the signal distortion. That is, the threshold value controller 71 changes the threshold value so as to decrease the peak restoration amount, thereby reducing the signal distortion.

Furthermore, the threshold value controller 71 may further reduce the signal distortion as, for example, the order of the modulation scheme, such as quadrature amplitude modulation (QAM), becomes higher, such as 16QAM, 32QAM, 64QAM, and so on, so that the signal may be appropriately received at the receiver side. In this case, the threshold value controller 71 increases the threshold value of the amplitude determining section 22 to reduce the signal distortion. That is, the threshold value controller 71 changes the threshold value so as to decrease the peak restoration amount, thereby reducing signal distortion.

Furthermore, the threshold value controller 71 may control the threshold value of the amplitude determining section 22 according to the number of carriers for a signal to be wirelessly transmitted. For example, generally, PAPR may become smaller as the number of carriers for the signal to be wirelessly transmitted becomes smaller. Hence, the threshold value controller 71 increases the threshold value of the amplitude determining section 22 as the number of carriers for the signal to be wirelessly transmitted becomes smaller. The carriers for the signal to be wirelessly transmitted may be, for example, orthogonal frequency division multiplexing (OFDM) carriers or multi-carrier code division multiple access (CDMA) carriers.

The threshold value to be controlled by the threshold value controller 71 is also output to the pre-emphasis section 72 and the de-emphasis section 73. The pre-emphasis section 72 changes the pre-emphasis amount based on the threshold value output from the threshold value controller 71.

For example, when the threshold value output from the threshold value controller 71 is changed to a smaller value, the peak restoration amount of the signal may become larger. Accordingly, the pre-emphasis section 72 emphasizes the high-frequency component further (that is, increases the pre-emphasis amount so as to allow a larger high frequency component of the signal to pass). The pre-emphasis section 72 may change, for example, the coefficients of the FIR filter to change the pre-emphasis amount, based on the threshold value output from the threshold value controller 71.

The de-emphasis section 73 changes the de-emphasis amount based on the threshold value output from the threshold value controller 71.

For example, when the threshold value output from the threshold value controller 71 is changed to a smaller value, the peak restoration amount of the signal may become larger. Accordingly, the de-emphasis section 73 suppresses the high-frequency component further (that is, increases the de-emphasis amount so as not to allow a larger high frequency component of the signal to pass). The de-emphasis section 73 may change, for example, the coefficients of the IIR filter to change the de-emphasis amount, based on the threshold value output from the threshold value controller 71.

Accordingly, the threshold value controller 71 of the peak suppressing apparatus controls the threshold value for the clipping performed by the clipping section 12 according to the number of carriers, the modulation scheme or the desired EVM for the signal to be wirelessly transmitted. Furthermore, the pre-emphasis section 72 and the de-emphasis section 73 change the pre-emphasis amount and the de-emphasis amount, respectively, based on the controlled threshold value. According to the above arrangement, the peak suppressing apparatus may be able to appropriately transmit a wireless transmission signal to the receiving side.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A peak suppressing apparatus comprising:
   a processor configured to:
      perform a pre-emphasis process on a signal, which is to be wirelessly transmitted and a peak of which is to be suppressed, the pre-emphasis process emphasizing a given frequency range component of the signal;
      limit, to a given threshold value, an amplitude of the signal that has been subjected to the pre-emphasis process;
      perform a de-emphasis process on the signal, whose amplitude has been limited, the de-emphasis process suppressing the given frequency range component of the signal; and
      control the given threshold value; and
   a frequency converter coupled to the processor and configured to convert, to allow wireless transmission, frequency of the signal that has been subjected to the de-emphasis process,
   wherein the processor changes a pre-emphasis amount for the signal that is to be wirelessly transmitted, based on the given threshold value that is being controlled, and changes a de-emphasis amount for the signal whose amplitude has been limited, based on the given threshold value that is being controlled.

2. The peak suppressing apparatus according to claim 1, wherein the processor performs the pre-emphasis process and band-limits the frequency band of the signal that is to be wirelessly transmitted.

3. The peak suppressing apparatus according to claim 1, wherein the processor performs the de-emphasis process and band-limits the frequency band of the signal whose amplitude has been limited.

4. The peak suppressing apparatus according to claim 1, wherein the processor controls the given threshold value according to a modulation scheme, a number of carriers, or an error vector magnitude, of the signal that is to be wirelessly transmitted.

5. A peak suppressing method for a peak suppressing apparatus, comprising:
performing a pre-emphasis process on a signal, which is to be wirelessly transmitted and a peak of which is to be suppressed, the pre-emphasis process emphasizing a given frequency range component of the signal;
limiting an amplitude, to a given threshold value, of the signal that has been subjected to the pre-emphasis process;
performing a de-emphasis process on the signal, whose amplitude has been limited to the given threshold value, the de-emphasis process suppressing the given frequency range component of the signal; and
converting a frequency, to allow wireless transmission, of the signal that has been subjected to the de-emphasis process; and
controlling the given threshold value;
wherein the pre-emphasis process changes a pre-emphasis amount for the signal that is to be wirelessly transmitted, based on the given threshold value that is being controlled; and
wherein the de-emphasis process changes a de-emphasis amount for the signal whose amplitude has been limited, based on the given threshold value that is being controlled.

6. The peak suppressing method according to claim 5, wherein the pre-emphasis process includes both the pre-emphasis process and band-limiting the frequency band of the signal that is to be wirelessly transmitted.

7. The peak suppressing method according to claim 5, wherein the de-emphasis process includes the de-emphasis process and band-limiting the frequency band of the signal whose amplitude has been limited.

8. The peak suppressing method according to claim 5, wherein the controlling of the given threshold value controls the given threshold value according to a modulation scheme, a number of carriers, or an error vector magnitude, of the signal that is to be wirelessly transmitted.

9. A wireless communications apparatus, comprising:
a processor configured to:
perform a pre-emphasis process on a signal, which is to be wirelessly transmitted and a peak of which is to be suppressed, the pre-emphasis process emphasizing a given frequency range component of the signal;
limit an amplitude, to a given threshold value, of the signal that has been subjected to the pre-emphasis process by the pre-emphasis section;
perform a de-emphasis process on the signal, whose amplitude has been limited by the clipping section, the de-emphasis process suppressing the given frequency range component of the signal; and
control the given threshold value
a frequency converter coupled to the processor and configured to convert a frequency of the signal that has been subjected to the de-emphasis process by the de-emphasis section; and
a transmitter configured to wirelessly transmit the signal whose frequency has been converted,
wherein the processor changes a pre-emphasis amount for the signal that is to be wirelessly transmitted, based on the given threshold value that is being controlled, and changes de-emphasis amount for the signal whose amplitude has been limited, based on the given threshold value that is being controlled.

10. The wireless communications apparatus according to claim 9,
wherein the processor performs the pre-emphasis process and band-limits the frequency band of the signal that is to be wirelessly transmitted.

11. The wireless communications apparatus according to claim 9,
wherein the processor performs the de-emphasis process and band-limits the frequency band of the signal whose amplitude has been limited.

12. The wireless communications apparatus according to claim 9,
wherein the processor controls the given threshold value according to a modulation scheme, a number of carriers, or an error vector magnitude, of the signal that is to be wirelessly transmitted.

* * * * *